Figure 5:
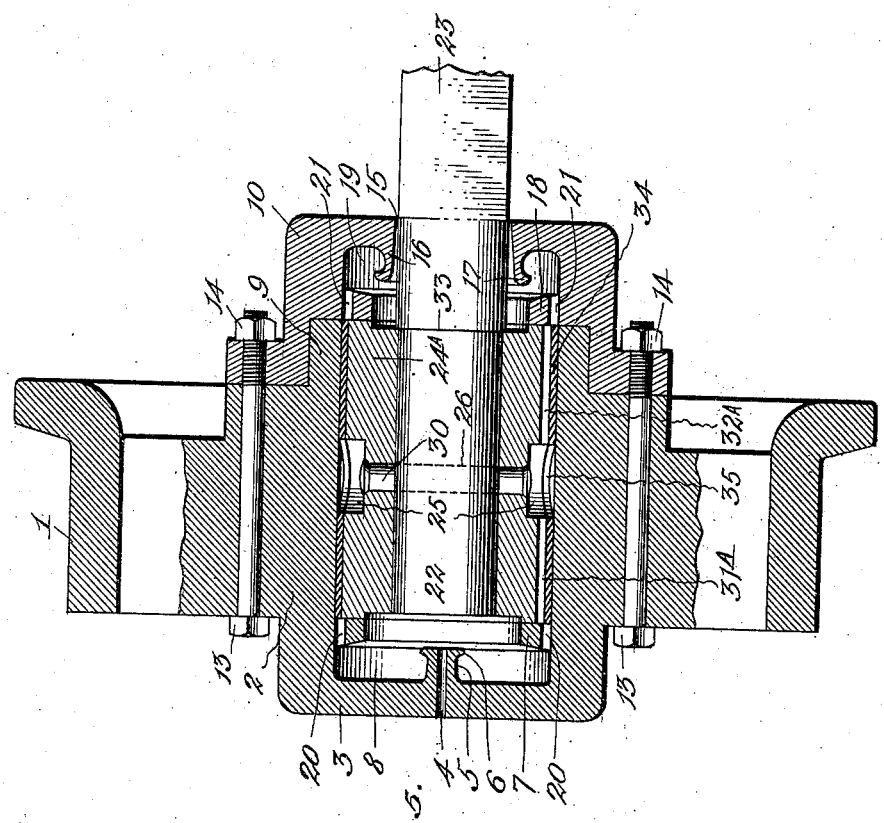

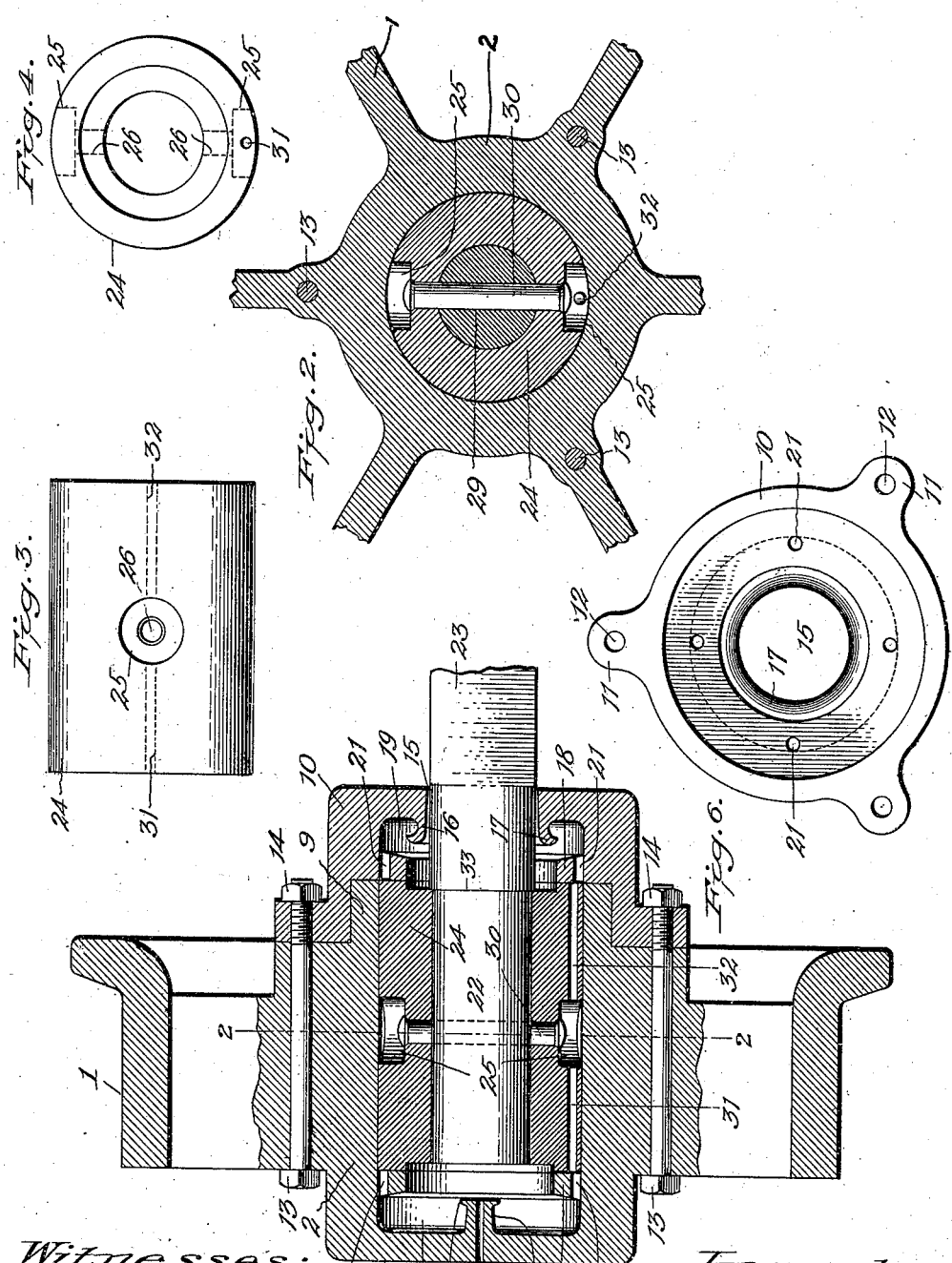

F. A. WARREN.
CENTRIFUGAL OILING BEARING FOR CAR WHEELS.
APPLICATION FILED JULY 12, 1910.

986,526.

Patented Mar. 14, 1911.

2 SHEETS—SHEET 2.

Witnesses:
G. Sargent Elliott
Adella M. Fowle

Inventor:
Frederic A. Warren
By A. S. Bailey
Attorney.

UNITED STATES PATENT OFFICE.

FREDERIC A. WARREN, OF CANON CITY, COLORADO.

CENTRIFUGAL OILING-BEARING FOR CAR-WHEELS.

986,526. Specification of Letters Patent. Patented Mar. 14, 1911.

Application filed July 12, 1910. Serial No. 571,548.

*To all whom it may concern:*

Be it known that I, FREDERIC A. WARREN, a citizen of the United States of America, residing at Canon City, county of Fremont, and State of Colorado, have invented a new and useful Centrifugal Oiling-Bearing for Car-Wheels, of which the following is a specification.

This invention relates to centrifugal oiling bearings for car wheels.

The object of the invention is to provide a practically dust-proof wheel hub having a space or chamber for receiving a quantity of oil sufficient to lubricate the wheel for a long period without the necessity of replenishing the same, the oil being distributed to the points to be lubricated by the rotation of the wheel, the wheel being connected to the axle in such manner that it is practically impossible for said wheel to become accidentally disconnected from the axle; the bearing being provided with passages connecting the oil chamber or reservoir with other passages by which the oil is distributed to the entire bearing surface of the wheel while the same is in motion, and surrounds the portion of the bearing carrying the weight, when the wheel is at rest, the axle being provided with a removable sleeve which receives the end thrust and which is also of sufficient length to take the excessive strain thrown upon it by the side pull in rounding curves. These objects are accomplished by the construction illustrated in the accompanying drawings, in which:

Figure 1, is a vertical sectional view through a car wheel constructed in accordance with my invention. Fig. 2, is a transverse section thereof on the line 2—2 of Fig. 1. Fig. 3, is a side elevation of the axle sleeve. Fig. 4, is an end view thereof. Fig. 5 is a longitudinal, sectional view through a car wheel showing the axle sleeve provided with a supplemental wearing sleeve or jacket; and Fig. 6, is a front view of a cap for closing the inner end of the wheel hub.

Similar letters of reference refer to similar parts throughout the several views.

In the practical operation of mining car wheels, it has been found desirable, if not essential, to provide wheels, the hubs of which are capable of retaining a quantity of oil sufficient to last for a considerable period of time. In wheels of this character, the difficulty has been to prevent the oil from working out at the inner end of the hub, and in wheels in which the hub is provided with oil grooves, the oil under centrifugal action is held in the grooves at the time when it is most needed, namely: when the wheel is under greatest speed. The grooves moreover soon become filled with gummed oil and dirt, which render them useless. The present invention is designed to overcome these objections by providing a practically dirt-proof bearing and one in which the oil circulates from one end of the bearing to the other, without escaping from the hub, thus effecting a great saving of oil, while it is necessary to replenish the supply only at long intervals.

Referring to the accompanying drawings, the numeral 1 indicates a wheel such as is used in connection with ordinary mining cars, though the invention is applicable to railway cars as well. The wheel is provided with a hub 2, the bore of which is of greater diameter than the axle spindle upon which the wheel is mounted. The front or outer end of the hub is closed by a wall 3, having a central oil inlet aperture 4, which also extends through a projecting lug 5, formed on the rear of the wall 3, the end of the lug terminating in an annular rim 6, as shown. An annular shoulder or collar 7 is formed in the hub adjacent to its forward end, the space between it and the wall 3 forming an oil chamber or reservoir 8. The inner end of the hub is reduced in diameter, as shown at 9, and upon this reduced end is fitted a cap 10, having ears 11, provided with threaded apertures 12. If the wheels are provided with six spokes, the cap is preferably provided with three of the ears 11, as shown in Fig. 6, and bolts 13 are passed through holes in three of the spokes and through the threaded apertures in the ears, and thus hold the cap upon the hub. The bolts are held against displacement by nuts 14.

The end wall of the cap is provided with an axial hole 15, in which the axle is designed to rotate, and this hole is surrounded by an inwardly projecting band or collar 16, which terminates in an annular rim 17. The cap is also provided with an annular collar or shoulder 18, a counterpart of the collar 7 in the hub, between which and the end of the cap an oil receiving chamber 19 is formed, similar to the chamber 8 in the hub. The chambers 8 and 19 are of the same diameter as the bore of the hub, and a plurality of holes 20 and 21 respectively are formed in the annular collars 7 and 18, at the point of their union with the hub, the purpose of which will fully appear hereinafter.

The axial hole 15 is preferably tapered so as to be greater in diameter at its inner end than at its outer end, and before the cap 10 is secured upon the hub the spindle 22 of an axle 23 is passed through the said hole 15, and a bearing sleeve 24 is secured thereon, the outer end of which is adapted, when inserted in the hub, to abut against the annular collar 7, while is inner end is adapted to bear against the annular collar 18 of the cap 10. This sleeve is formed with oppositely positioned circular recesses 25, and diametrically opposite holes 26 extend through the bottom faces of the recesses 25 to the bore of the sleeve. The spindle is provided with a transverse hole 29, which is adapted to register with the holes 26 in the sleeve, and through these holes a steel pin 30 is passed, and riveted at its ends. A hole 31 is formed in the sleeve 24 and extends from the forward end thereof to one of the circular recesses 25, and a similar hole 32 extends from the recess 25 through the rear end of the sleeve. It will thus be seen that the oil in the reservoir 8 at the outer end of the hub passes through the hole 31, into the recess 25, and thence through the hole 32 to the reservoir 19 in the cap, and when the wheel is in motion the oil works around the sleeve from end to end, or in other words is kept continually circulating from both reservoirs to the recess 25. The holes 20 and 21, in the annular collars 7 and 18 respectively form additional means for conveying the oil to the bearing surfaces of the hub and sleeve, and particularly between the ends of the sleeve and the said collars.

The spindle proper terminates as its inner end in a shoulder 33, which bears against the inner end of the sleeve, from which point to a point slightly beyond the entrance to the aperture 15 the spindle is of slightly greater diameter, the axle being preferably square in cross section outside of the cap 10. As the wheel revolves upon the sleeve 24, the oil in the reservoir 19 is carried around the band 16, but is prevented from working onto the axle by the flange or rim 17, and the taper of the hole 15 causes any oil that may work into the same to flow back into the chamber 19. The annular rim 6 on the lug 5 also prevents oil which works around the said lug 5 from passing out through the aperture 4.

In Fig. 5 is illustrated a bearing sleeve 24$^A$ similar to the sleeve shown in Figs. 1 and 3, with the exception that in the latter construction slots 31$^A$ and 32$^A$ take the place of the holes 31 and 32 and the sleeve is incased in a thin supplemental sleeve or jacket 34 having oppositely positioned holes 35, which are adapted to register with the recesses 25 in the said sleeve. When the supplemental sleeve is employed, the inner sleeve may be made of cast iron, and the supplemental sleeve, when worn out, may be removed and replaced by a new one, thus reducing the cost of maintaining the bearings, and the time required for repairs to a minimum.

In assembling the parts, the spindle 22 is first inserted in the axial hole 15 of the cap 10, and the sleeve 24 is then placed on the spindle so that the holes 26 in the said sleeve shall register with the hole 29 in the spindle. The pin 30 is then passed through the said holes and riveted at its ends, and the sleeve is then inserted in the axle hub and secured against displacement by the bolts 13, as previously described, the outer and inner ends of the sleeve bearing against the collars 7 and 18 respectively.

The reservoir 8 in the hub is supplied with oil through the inlet 4, and the oil passes through the hole 31 to the recess 25, and thence to the reservoir 19, whence it works in between the sleeve and hub, and from one end of the same to the other, as previously described, thus not only being kept in constant circulation while the wheel is in motion but it is retained within the bearing, thus effecting a great saving in oil, and at the same time making it necessary to replenish the reservoir only at long intervals.

The present invention is particularly applicable to small wheels and is designed as an improvement over an oiling bearing for which a patent was granted to me on the 21st of June, 1910, No. 962,182.

Having described the invention, what I claim as new and desire to secure by Letters Patent is:

1. In an oiling bearing as specified, the combination of a wheel hub having a closed end provided with an inlet aperture, and an annular collar adjacent to said closed end, a pocket being formed between said collar and end; a removable cap for the opposite end of the hub, having an axial hole in its end and an annular collar adjacent to said end, a pocket being formed between said collar and end; a sleeve in said hub having passages connecting the said pockets, the ends of said sleeve abutting against said annular collars; an axle extending through the hole in said cap and into said sleeve, and a pin securing said axle and sleeve together.

2. In an oiling bearing as specified, the combination with a wheel hub having a closed end provided with an oil inlet aperture, and an annular collar adjacent to said closed end, an oil pocket being formed between said collar and end, of a cap for the opposite end of the hub having an axial tapered hole in its end and an annular collar adjacent to said end, an annular pocket being formed by said collar and the end of the cap; a sleeve in said hub having passages connecting the annular pockets, said collars being adapted to receive the end thrust of said sleeve; an axle extending through the tapered hole in said cap and into the sleeve; a pin extending through the sleeve and axle, and securing bolts which extend through said cap and the wheel spokes.

3. In an oiling bearing as specified, the combination with a wheel hub having a closed end, a lug projecting centrally from the inner faces of said end and terminating in an annular rim, an oil inlet being formed through said lug and closed end, and an inner annular collar adjacent to the closed end, of a removable cap for the other end of the hub having an inner annular collar adjacent to its end and a tapered axial hole in said end, annular pockets being formed by said collars and the end of the hub and cap respectively; a sleeve in said hub having passages connecting said pockets, said collars being adapted to take the end thrust of the sleeve and being provided with apertures which extend through them at the point of their union with the hub and cap respectively; an axle extending through the tapered aperture of the cap and into the sleeve, and means for securing the sleeve and axle together.

4. In an oiling bearing as specified, the combination with a wheel hub having one end open and one end closed, a lug projecting from the closed end, which terminates in an annular rim, an inlet hole extending through said closed end and lug, of a sleeve revolubly mounted in said hub; an axle rigidly secured within the sleeve; a cap removably secured to the open end of the hub having an axial hole through which the hub extends, and an inwardly extending band which surrounds said axle and terminates in an annular rim, and collars in the hub and cap against which the end of the sleeve abuts, annular pockets being formed by said collars and the ends of the hub and cap respectively, the sleeve being provided with longitudinal holes which connect the said annular pockets.

5. In an oiling bearing as specified, the combination of a wheel hub having one end closed; a sleeve in said hub having diametrically opposite recesses from which holes extend through to the bore of said sleeve; a jacket surrounding the sleeve having diametrically opposite holes adapted to register with the recesses in the sleeve, said sleeve having passages which extend from its ends to one of said recesses; an axle extending into said sleeve having a hole adapted to register with the holes in said sleeve; a pin extending through said axle and sleeve; a cap for the open end of the hub having a tapered axial hole for the passage of the axle; an axial band forming a continuation of the tapered hole, which surrounds the axle and terminates in an annular rim, the closed end of the hub being provided with an axial oil inlet hole, and collars adjacent to the ends of the cap and hub which form with said ends annular pockets which communicate with the passages in the sleeve.

6. In an oiling bearing as specified, a wheel hub closed at one end and provided with an oil inlet; a sleeve in said hub; a jacket surrounding said sleeve; an axle secured within the sleeve; a cap on the open end of the hub having an axial hole to receive the axle, and means for preventing the escape of oil through said axial hole; annular abutments adjacent to the ends of the hub and sleeve, which form with said ends annular oil pockets, said sleeve being provided with passages connecting said pockets.

7. In an oiling bearing as specified, a wheel hub closed at one end and provided with an oil inlet; a sleeve in said hub; an axle secured within the sleeve; a cap on the open end of the hub having an axial hole to receive the axle, and ears provided with threaded holes; bolts which extend through the threaded holes and secure the cap to the hub; means for preventing the escape of oil through the axial hole; annular abutments adjacent to the ends of the hub and sleeve which form with said ends annular oil pockets, said sleeve being provided with passages which connect said pockets.

In testimony whereof I affix my signature in presence of two witnesses.

FREDERIC A. WARREN.

Witnesses:
H. C. GLAGE,
G. S. ELLIOTT.

---

Copies of this patent may be obtained for five cents each, by addressing the "Commissioner of Patents, Washington, D. C."